(12) United States Patent
Nourbakhsh et al.

(10) Patent No.: US 10,652,190 B2
(45) Date of Patent: May 12, 2020

(54) SYSTEM AND METHOD FOR DETECTING GEO-LOCATIONS IN SOCIAL MEDIA

(71) Applicant: THOMSON REUTERS ENTERPRISE CENTRE GMBH, Zug (CH)

(72) Inventors: Armineh Nourbakhsh, Brooklyn, NY (US); Sameena Shah, White Plains, NY (US)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 64 days.

(21) Appl. No.: 15/787,416

(22) Filed: Oct. 18, 2017

(65) Prior Publication Data

US 2018/0131654 A1 May 10, 2018

Related U.S. Application Data

(60) Provisional application No. 62/419,609, filed on Nov. 9, 2016.

(51) Int. Cl.
*G06F 15/16* (2006.01)
*H04L 12/58* (2006.01)
(Continued)

(52) U.S. Cl.
CPC .............. *H04L 51/20* (2013.01); *G06F 9/547* (2013.01); *H04L 51/32* (2013.01); *H04L 67/18* (2013.01); *H04W 4/02* (2013.01); *H04W 4/21* (2018.02)

(58) Field of Classification Search
CPC ...................................................... H04L 51/20
See application file for complete search history.

(56) References Cited

U.S. PATENT DOCUMENTS

| | | |
|---|---|---|
| 2008/0021925 A1 | 1/2008 | Sweeney |
| 2008/0155368 A1* | 6/2008 | Bofferding ................ G06F 8/65 |
| | | 714/746 |

(Continued)

OTHER PUBLICATIONS

International Search Report and Written Opinion dated Jan. 12, 2018, of the corresponding International Application PCT/US2017/057216 filed Oct. 18, 2017, 17 pages.
(Continued)

*Primary Examiner* — Hua Fan
(74) *Attorney, Agent, or Firm* — Norton Rose Fulbright US LLP

(57) ABSTRACT

A method of determining locations for social media postings may include: retrieving, by communicating with at least one application programming interface (API) of a social media system over one or more first communication networks, at least one social media posting; determining at least one location mention in the at least one social media posting; determining at least one location based on the at least one location mention; determining a primary location from the at least one location; storing, in at least one database on a non-transitory machine-readable storage medium, at least one set of geo-coordinates for the primary location in at least one posting object for the at least one social media posting; and outputting, by communicating with a user system over one or more second communication networks, the at least one social media posting with the stored at least one set of geo-coordinates for display on the user system.

30 Claims, 15 Drawing Sheets

(51) Int. Cl.
*H04W 4/21* (2018.01)
*H04W 4/02* (2018.01)
*G06F 9/54* (2006.01)
*H04L 29/08* (2006.01)

(56) References Cited

U.S. PATENT DOCUMENTS

| | | | |
|---|---|---|---|
| 2010/0121843 | A1 | 5/2010 | Goeldi |
| 2012/0059901 | A1 | 3/2012 | Tsai |
| 2012/0079020 | A1 | 3/2012 | Park et al. |
| 2012/0136865 | A1 | 5/2012 | Blom et al. |
| 2012/0173635 | A1* | 7/2012 | Wormald ............ G06Q 10/107 709/206 |
| 2013/0103389 | A1 | 4/2013 | Gattani et al. |
| 2013/0290208 | A1 | 10/2013 | Bonmassar et al. |
| 2014/0040371 | A1 | 2/2014 | Gurevich et al. |
| 2014/0081636 | A1 | 3/2014 | Erhart et al. |
| 2014/0201227 | A1 | 7/2014 | Hamilton-Dick et al. |
| 2014/0214819 | A1 | 7/2014 | Aitchison |
| 2014/0236916 | A1 | 8/2014 | Barrington et al. |
| 2014/0337257 | A1 | 11/2014 | Chatterjee et al. |
| 2015/0120502 | A1 | 4/2015 | Jung et al. |
| 2015/0120788 | A1* | 4/2015 | Brun ...................... G06F 16/22 707/812 |
| 2015/0264518 | A1 | 9/2015 | Dal Santo et al. |
| 2016/0019301 | A1 | 1/2016 | Goldenstein et al. |
| 2016/0203498 | A1 | 7/2016 | Das et al. |
| 2016/0328482 | A1 | 11/2016 | Shah et al. |

OTHER PUBLICATIONS

Castillo et al., "Information Credibility on Twitter", WWW 2011, Mar. 28-Apr. 1, 2011, Hyderabad, India, ACM 978-1-4503-0632—Apr. 11, 2003, pp. 675 to 684.
Gupta et al., "Faking Sandy: Characterizing and Identifying Fake Images on Twitter during Hurricane Sandy", WWW 2013 Companion, May 13-17, 2013, Rio de Janeiro, Brazil, ACM 978-1-4503-2038—Feb. 13, 2005.
Boididou et al., "Challenges of Computational Verification in Social Multimedia", WWW14 Companion, Apr. 7-11, 2014, Seoul, Korea, ACM 978-1-4503-2745—Sep. 14, 2004, http:l/dx.doi.org/10.1145/2567948.2579323, pp. 743 to 748.
Finn et al., "Investigating Rumor Propagation with TwitterTrails", http://cs.wellesiey.edu/~pmetaxas!TwitterTmilsinvestigating- rumor-propagation.pdf, 10 pages.
Leskovec et al., "Meme-tracking and the Dynamics of the News Cycle", KDD '09 Paris, France, 9 pages.
Ratkiewicz et al., "Detecting and Tracking Political Abuse in Social Media", Proceedings of the Fifth International AAAI Conference on Weblogs and Social Media, pp. 297 to 304.
Ennals et al., "Highlighting Disputed Claims on the Web", WWW 2010, Apr. 26-30, 2010, Raleigh, North Carolina, USA, ACM 978-1-60558-799—Aug. 10, 2004, 10 pages.
Osborne et al., "Real-Time Detection, Tracking, and Monitoring of Automatically Discovered Events in Social Media", Proceedings of 52nd Annual Meeting of the Association for Computational Linguistics: System Demonstrations, Baltimore, Maryland USA, Jun. 23-24, 2014, pp. 37-42.
Preotiuc-Pietro et al., "A temporal model of text periodicities using Gaussian Processes", Proceedings of the 2013 Conference on Empirical Methods in Natural Language Processing, Seattle, Washington, USA, Oct. 18-21, 2013, pp. 977-988.
Friggeri et al., "Rumor Cascades", Proceedings of the Eighth International AAAI Conference on Weblogs and Social Media, pp. 101-110.
Mendoza et al., "Twitter Under Crisis: Can we trust what we RT?", 1st Workshop on Social Media Analytics (SOMA '10), Jul. 25, 2010, Washington, DC, USA, 9 pages.
Petrovic et al., "Streaming First Story Detection with application to Twitter", http://homepages.inf.ed.ac.uk/miles/papers/naacl10a.pdf, 9 pages.
Qazvinian et al., "Rumor has it: Identifying Misinformation in Microblogs", Proceedings of the 2011 Conference on Empirical Methods in Natural language Processing, Edinburgh, Scotland, UK, Jul. 27-31, 2011, pp. 1589-1599.
Wu et al., "False Rumors Detection on Sina Weibo by Propagation Structures", http://www.cs.sjtu.edu.cn/-kzhu/papers/kzhu-rumor.pdf, 12 pages.
Yang et al., "Automatic Detection of Rumor on Sina Weibo", MDS'12 Aug. 12, 2012, Beijing,China, 7 pages.
Sun et al., "Detecting Event Rumors on Sina Weibo Automatically", APWeb 2013, LNCS 7808, 2013, pp. 120-131.

* cited by examiner

400
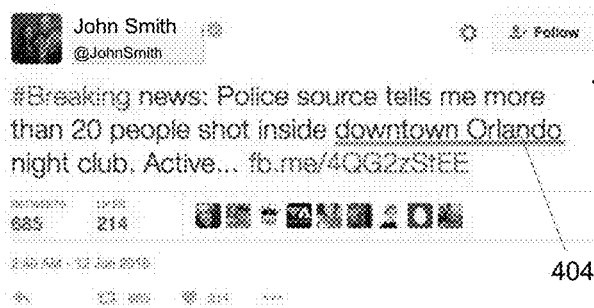
FIG. 4(a)
FIG. 4(b)
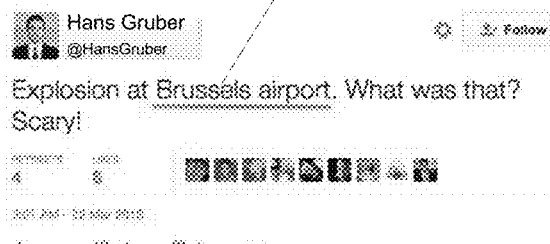
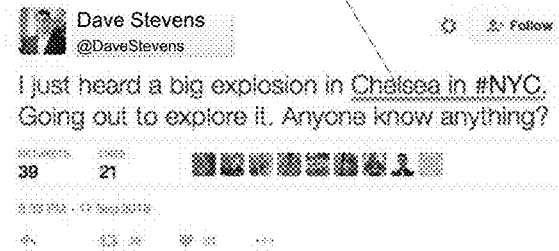
FIG. 4(c)
FIG. 4(d)

SYSTEM AND METHOD FOR DETECTING GEO-LOCATIONS IN SOCIAL MEDIA

CROSS REFERENCE TO RELATED APPLICATIONS

This application claims priority to U.S. Application No. 62/419,609 filed on Nov. 9, 2016, which is hereby incorporated by reference herein in its entirety. This application is also related to U.S. Non-Provisional patent application Ser. No. 15/143,730, filed on May 2, 2016, which is also hereby incorporated by reference herein in its entirety.

BACKGROUND INFORMATION

Geo-location detection from text is a difficult task. Detecting geo-locations from social data is further complicated by the prominence of hashtags, platform-specific lingo, lack of punctuation, capitalization, and proper grammar. Some of the main challenges in identifying locations accurately in social media postings include the following:

1) Lack of proper standards or heuristics: There are no definitive strategies for identifying locations in text, since they can be expressed in a variety of ways.

2) Ambiguous words: Ambiguous words, for instance names of locations that can also be names of people, are prominent.

3) Lack of standard grammar: Many social media users use informal and somewhat sub-standard language in their messages, and many social media outlets have their own lingo. This means that models that have been trained on standard English cannot perform well on social data.

4) Prominence of hashtags: Hashtags are used across many social platforms to indicate metadata related to a message, e.g. its topic. Over years of usage on social media, hashtags have taken a life of their own, interceding or succeeding a message with witty or creative tokens. On many occasions users mix more than one word to make a composite hashtag or express the location of an event via a trailing hashtag. In these instances, automated parsers are unable to break down the hashtags properly.

5) Consistency of self-identified user locations: Users can often choose to identify their location in their profile. For many social media platforms, this location does not need to be validated and can be expressed as free-text. This has led to the inevitable prominence of creative but non-viable locations.

6) Granularity of information: Some disaster-response teams, police and fire departments set up official social media accounts to report emergencies in real-time. The locations they identify in their messages are often specific to their location. For instance, "Injury wreck being reported on Hwy 183 NB at Loyola Ln. Back-ups toward MLK" includes a granular description of the address of an accident, which might be difficult to parse. Moreover the address might be difficult to locate, since a similar address or intersection might exist in many different cities.

7) Identifying the correct geo-coordinates: Even if words that refer to locations are accurately identified, sometimes they can be mapped to various geo-coordinates. For instance there are several cities named "Orlando" in the United States (e.g., in Florida, Oklahoma, West Virginia, New York, Virginia, Kentucky, North Carolina, and Arkansas).

8) Identifying the primary location of an event: Consider the message "Rebel Groups Supported By Turkey & US Reportedly Clash W/US-Backed Kurdish Group In Syria" which mentions three countries. It can be important to understand which location is where the event took place (i.e., Syria).

9) Timeliness & sustainability requirements: Even though machine learning models might yield good precision/recall numbers, they are often too slow to be applicable in real-time. In addition, since many of these models are trained on static training data, they will require periodic updates and adjustment.

Therefore, a system is desired that addresses all of the above challenges and provides a validated model against other geo-location services.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

FIG. 4(a)-4(d) show exemplary social media postings having geo-locations that can be detected according to an embodiment of the disclosure.

DETAILED DESCRIPTION OF EXAMPLE EMBODIMENTS

Figure 1:
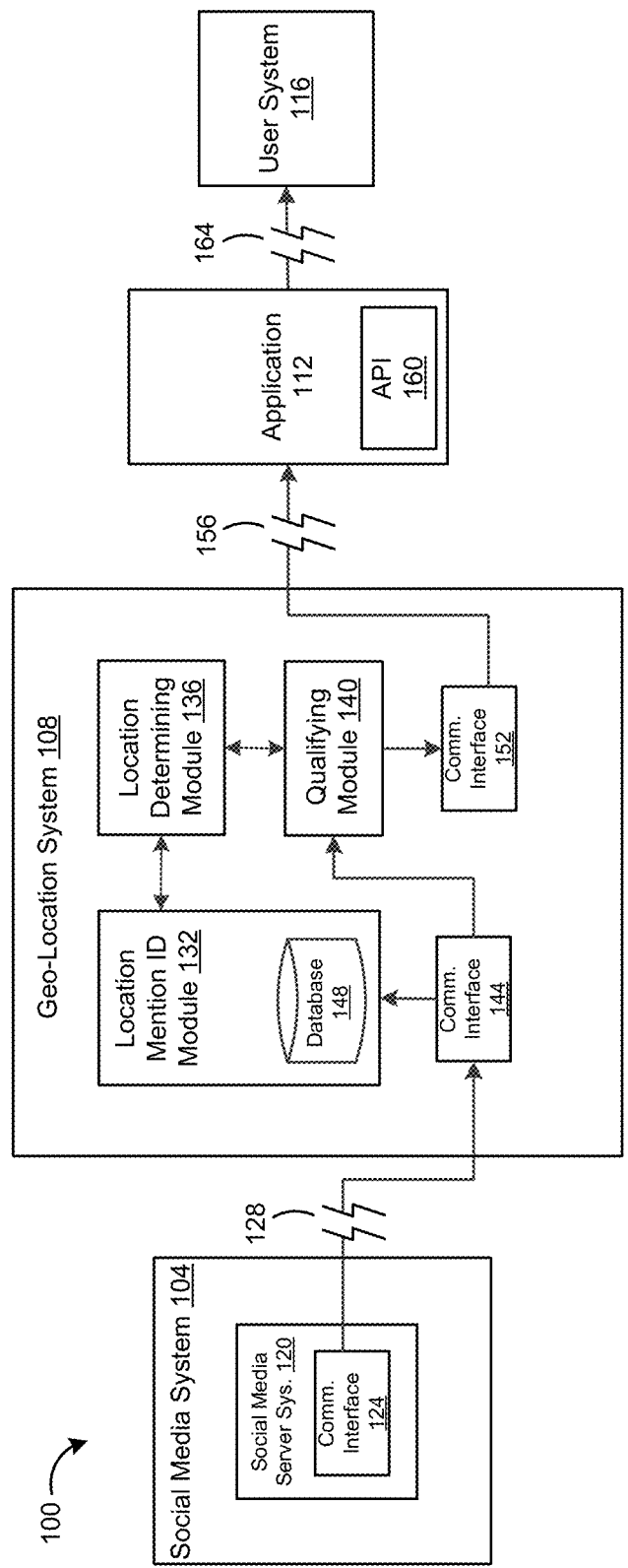
FIG. 1 is a schematic diagram depicting an embodiment of a system for detecting geo-locations in postings of social media systems such as microblogs according to an embodiment of the disclosure.

Disclosed are embodiments of systems and methods for detecting geo-locations in postings of social media systems such as microblogs. Referring now to the figures, FIG. 1 shows a schematic diagram depicting an embodiment of a system 100 for detecting geo-locations in social media postings. The system 100 includes a social media system 104, a geo-location system 108, an application 112, and a user system 116.

The social media system 104 provides a platform for its users to post postings and/or content to a network of other users using accounts of the system 100. The social media system 104 includes a social media server system 120 having a communication interface 124. The social media server system 120 provides functionality of the social media system 120 for users and as discussed herein, with the communication interface 124 providing communications over one or more communication networks 128 between the social media system 120 and other systems. In embodiments, the social media system 120 can take various different forms. In one example, the social media system 120 can be Twitter, in which users use their accounts to, among other things, post short postings and/or content, called Tweets, on the system. In other embodiments, the social media system 120 can be another system, such as one or more of Facebook, Instagram, Snapchat, Tumblr, Pinterest, Flickr, or Reddit, etc.

The geo-location system 108 includes a location mention identification module 132, a location determining module 136, and a qualifying module 140. The geo-location system 108 has a communication interface 144 that interfaces with the social media system 120 to retrieve social media postings and send them to location mention identification module 132 to identify and/or detect any location mentions in the postings or set of postings. Location mention identification module 132 can also extract locations specified by users of the social media system 120.

The location mention identification module 132 has a database 148 for storing various locations, location ranks/scores, and geo-coordinates. The location determining module 136 finds the latitude and longitude geo-coordinate information associated with the detected locations using a location/geo-coordinate library. In some embodiments, the location library is a third-party library.

The qualifying module 140 uses a various methods to qualify and/or disambiguate locations, find the correct geo-coordinates for each location, and rank the locations based on a level of relevance to an event. The qualifying module 140 outputs location information to a communication interface 152. In the embodiment shown, each of location mention identification module 132, location determining module 136, and qualifying module 140 can communicate with each other. In the embodiment shown, communication interface 152 of geo-location module 108 outputs location information as metadata in a posting object of the social media posting over one or more communication networks 156 to application 112 for display on user system 116. In the embodiment shown, application 112 may include an application programming interface (API) 160. In the embodiment shown, application 112 communicates with user system via one or more communication networks 164. Alternatively, the geo-location system may output directly to the user system 116.

The user system 116 may be any computing platform, such as one or more of a computer, a desktop computer, a laptop computer, a tablet, a smart phone, or other stationary or mobile devices, etc., that a user uses to communicate with other systems via one or more communication networks 164.

In some embodiments, the system 100 for detecting geo-locations in various social media postings may include only any subset of, or an alternative connection of, the features depicted in or discussed herein in regard to FIG. 1.

Figure 2:
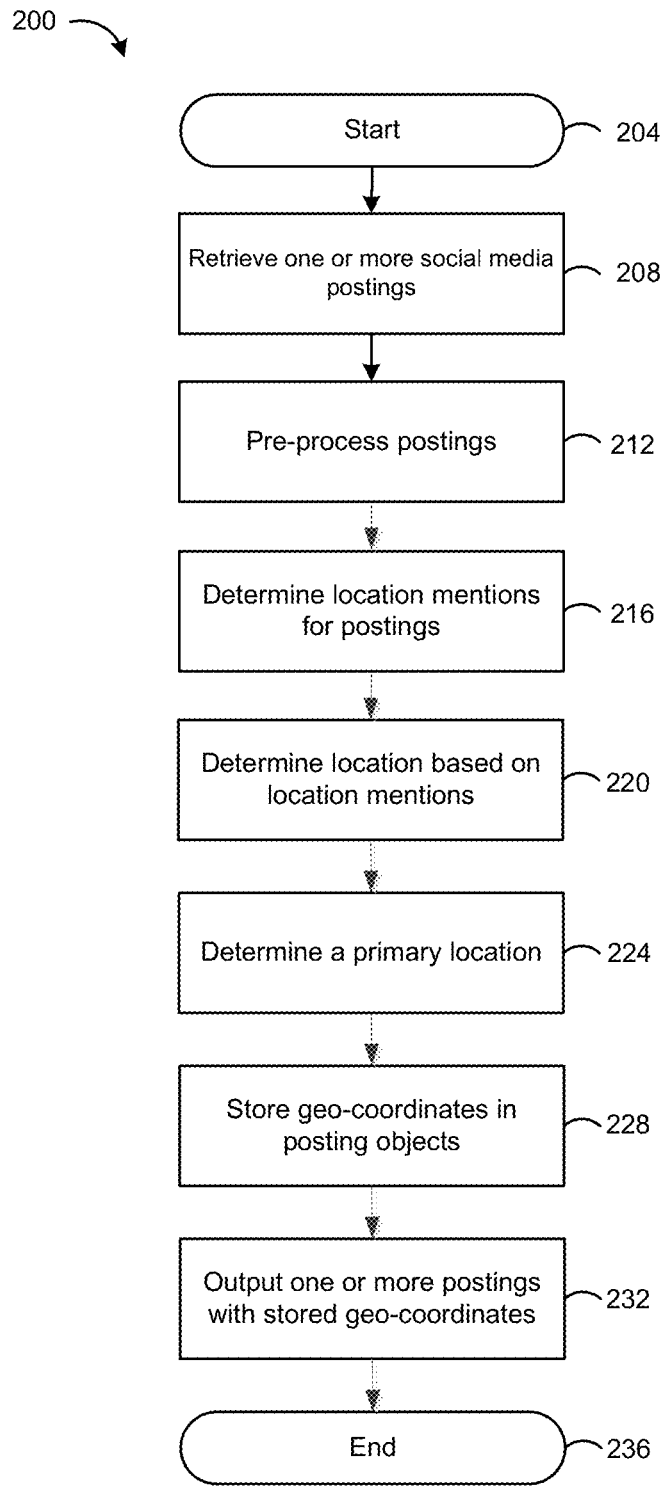
FIG. 2 is a flowchart depicting an embodiment of a method of detecting geo-locations in postings of social media systems such as microblogs according to an embodiment of the disclosure.

FIG. 2 shows a flowchart depicting an embodiment of a method 200 of detecting geo-locations in postings of various social media systems such as microblogs according to an embodiment of the disclosure. The method may be performed by or involving components of the system 100 of FIG. 1, such as by the geo-location system 108. The method begins at step 204.

At step 208, one or more social media postings are retrieved from social media server system 120. In the embodiments shown, geo-location module 108 communicates with social media server system 120 via communication interfaces 124, 144 over network 128 to retrieve one or more social media postings of one or more social media accounts.

At step 212, the retrieved social media postings are pre-processed. In some embodiments, the pre-processing is performed by geo-location system 108. In other embodiments, the pre-processing can be performed by a separate processing module and the pre-processed social media postings then input into the geo-location system 108. The pre-processing involves one or more functions performed by the system to clean and prepare postings before identifying potential locations of the postings, as discussed herein. For example, the pre-processing may include any combination of the features of the systems and methods of FIGS. 3-5, or any combination of any subset and/or alternative ordering of the features of such system or methods.

At step 216, the system determines location mentions for the received and pre-processed social media postings. In the embodiments shown, location mention identification module 132 determines location mentions by performing one or more of identifying location mentions from the text of the social media posting and/or from a user location of a social media account, as discussed herein. For example, determining location mentions may include any combination of the features of the systems and methods of FIGS. 6-10, or any combination of any subset and/or alternative ordering of the features of such system or methods.

At step 220, the system determines locations based on the determined location mentions. In the embodiments shown, location determining module 136 receives the determined location mentions from location mention identification module 132 and determines possible geo-coordinates (i.e., latitude and longitude coordinates) for the geographic locations corresponding to the determined location mentions, as discussed herein. For example, determining locations based on the location mentions may include any combination of the features of the systems and methods of FIGS. 11-12, or any combination of any subset and/or alternative ordering of the features of such system or methods.

At step 224, the system determines a primary location of each location mention based on the determined locations. In the embodiments shown, qualifying module 140 receives the determined geographic locations from location determining module 136 and determines which location is a primary location corresponding to each location mention in the social media posting, as discussed herein. For example, determining locations based on the location mentions may include any combination of the features of the systems and methods of FIGS. 13-16, or any combination of any subset and/or alternative ordering of the features of such system or methods.

At step 228, the system stores the geo-coordinates for the determined primary location in a social media posting object. In the embodiments shown, for each location mention of a social media posting, the system adds the geo-coordinates for the primary location corresponding to that location mention. In some embodiments, the geo-coordinates can be added as one or more metadata fields to the posting object. In some embodiments, the geo-coordinates for each location can be communicated to location mention identification module 132 to be stored in database 148 on a non-transitory machine-readable storage medium for future location determination processes for future retrieved social media postings.

At step 232, the social media posting objects containing the geo-coordinates for their location mentions can be output to any downstream application seamlessly and in real-time. In the embodiments shown, the posting objects can be output from geo-location module 108 to an API 160 of application 112 via network 156 and then output for display on a user system 116 via network 164. Alternatively, the posting objects can be output directly to user system 116. The method ends at step 236.

In some embodiments, the method 200 for detecting geo-locations in various social media postings may include only any subset of, or an alternative connection of, the features depicted in or discussed herein in regard to FIG. 2.

Figure 3:
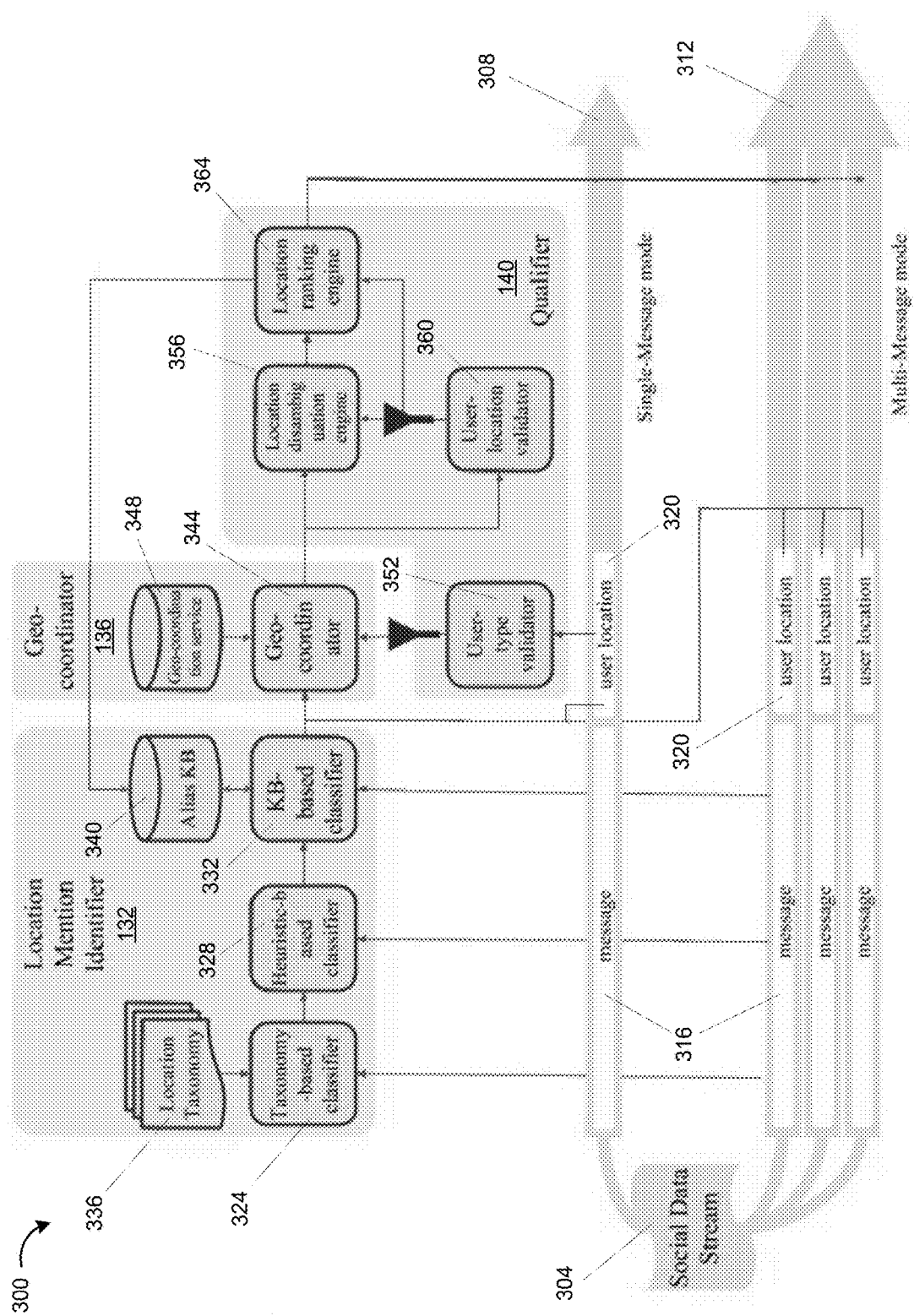
FIG. 3 is a schematic diagram depicting an embodiment of an exemplary system architecture for detecting geo-locations in postings of social media systems such as microblogs according to an embodiment of the disclosure.

FIG. 3 shows a schematic diagram depicting an exemplary embodiment of the geo-location system 108 for detecting geo-locations in postings of various social media systems such as microblogs in further detail according to an embodiment of the disclosure. In the embodiment shown, the system 108 retrieves one or more social media postings from a social data stream 304. In some embodiments, social media stream 304 can be outputted from social media server system 120. In the embodiment shown, the system can retrieve social media postings in a single-posting mode 308 and/or a multi-posting mode 312. In single-posting mode 308, the system determines geo-location information based on single postings from user accounts, as discussed herein. In multi-posting mode 312, the system determine geo-location information based on multiple postings received from multiple user accounts. In each mode, each social media posting can include both a posting 316 in text and/or a user location 320. In the embodiment shown, the text postings 316 of the social media postings are input into location mention identification module 132.

In the embodiment shown, location mentions from the posting text 316 of the social media postings and the user locations 320 of the social media postings are input into location determining module 136. In the embodiment shown, possible location geo-coordinates for each location mention are input into qualifying module 140. In the embodiment shown, primary location geo-coordinates for each location mention in the posting text 316 and/or user location 320 are output from qualifying module 140 and added to the posting object for each social media posting received from social data stream 304.

In some embodiments, the system 300 for detecting geo-locations in various social media postings may include only any subset of, or an alternative connection of, the features depicted in or discussed herein in regard to FIG. 3.

FIGS. 4(a)-4(d) show exemplary social media postings 400 having geo-locations that can be detected according to an embodiment of the disclosure. In the embodiments shown, various examples of social media postings that can be received from social media server system 120 as a part of social data stream 304 are depicted. In each social media posting 400 shown, there is a geo-location 404, 408, 412, 416 mentioned in the posting text. When each social media posting 400 is analyzed by the disclosed system, the posting object can be updated with primary location geo-coordinates for each location mention.

In some embodiments, the exemplary social media postings 400 having geo-locations that can be detected may include only any subset of, or an alternative connection of, the features depicted in or discussed herein in regard to FIGS. 4(a)-4(d).

Figure 5:
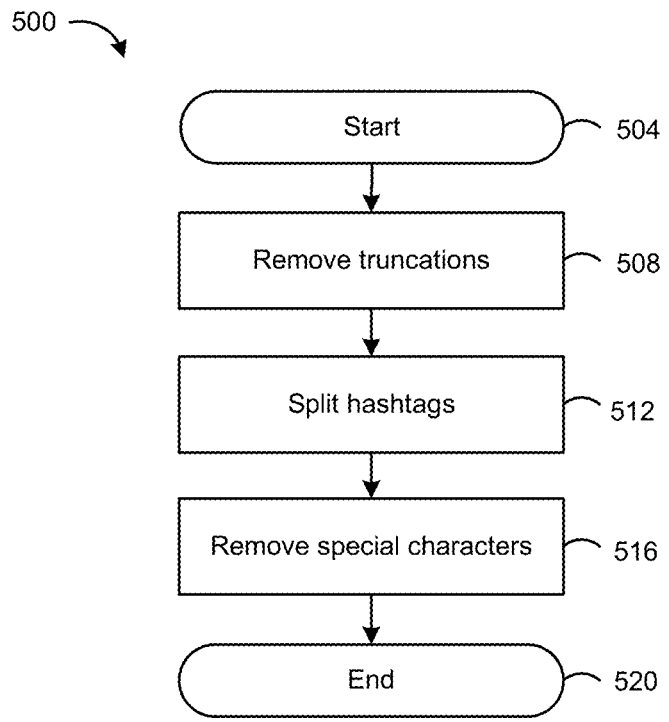
FIG. 5 is a flowchart depicting an embodiment of a pre-processing method according to an embodiment of the disclosure.

FIG. 5 shows a flowchart depicting an embodiment of a pre-processing method 500 according to an embodiment of the disclosure. In some embodiments, pre-processing method 500 is performed as step 212 of method 200. Prior to processing the social media posting(s) to identify potential locations, the system may perform a few preprocessing steps to clean and prepare the posting(s). Method 500 begins at step 504. In step 508, the system removes truncations from the posting text. In social media platforms such as Twitter, truncated postings are common in automated post-sharing applications. For example, when a posting exceeds Twitter's 140-character limit, the trailing part of the posting is automatically removed by third-party applications. This can cause potential issues for the system. For instance, consider a truncated tweet that reads "Let us celebrate New York . . . " It's unclear whether the trailing word refers to a location such as "New York City," or if it was meant to say "New Yorker magazine." Therefore, in step 508, the system ignores and/or removes all truncation symbols and truncated words and phrases from the posting text.

However, in some embodiments, removing truncations is not as simple as merely identifying postings having the truncation symbol (i.e., an ellipsis represented by " . . . ") at the end of the posting. On many occasions, automated applications may append additional hashtags, mentions, or URLs to the end of the posting (e.g. "Let us celebrate New York . . . via @AwesomeApp"). This often comes at the expense of the length of the original posting. Moreover, not all postings that end with an ellipsis are truncated; sometimes users use the symbol simply as a mode of expression. To address these difficulties, the system, in step 508, can use two main clues to determine if a tweet is truncated: 1) if the posting length is close to the character limit, and, 2) if the posting ends with either of two main truncation symbols (i.e. " . . . " and the unicode character for horizontal ellipsis) potentially followed by a standard expression of truncation (e.g., "via @handle," or "via # hashtag"). In embodiments, if a posting matches the above criteria, the last word or token before the truncation symbol is removed as well as the remaining tail-end of the posting.

In step 512, the system splits hashtags that appear in the posting text of the social media posting. In social media postings, hashtags can play an important role in identifying locations, especially when no other clue is available. Many reliable official accounts (e.g., from disaster response teams, weather channels, traffic monitors, etc.) often use hashtags to convey location information (e.g., "# BuelahHillFire"). In many instances, these official accounts are often careful to use different letter-casing in their postings to denote locations within hashtags. In order to use hashtag information, the system inspects each posting to determine whether it is written in ALL-CAPS (i.e., written using all capital letters). If ALL-CAPS is not used, the system splits each hashtag based on the location of its uppercase letters. For instance, the hashtag # BuelahHillFire can be broken into the text "# Buelah Hill Fire." If multiple uppercase letters appear next to each other, the system reattaches any dangling letters back together. For instance, the hashtag "# LAFlood" will be broken into "# L A Flood," and then the dangling letters "L" and "A" reattached to read "# LA Flood."

In some embodiments, the system keeps the hashtag symbol in order to distinguish between hashtag-based locations and other locations determines from the posting text. This helps delimit the beginning of hashtag-based locations from the rest of the posting text. For instance, consider the posting "Hurricane Matthew moving towards Florida # HaitiDisaster." Once the hashtag is broken down by the described processes, the posting will read "Hurricane Matthew moving towards Florida # Haiti Disaster." If the hashtag symbol is removed, the system might mistakenly identify "Florida Haiti" as a single location due to consistent letter-casing. Therefore, retaining the hashtag symbol ensures that the system determines that "Florida" and "Haiti" are two different locations.

In step 516, the system removes special characters that appear in the posting text of the social media posting. Special characters may include non-alphanumeric characters found in the posting text. In embodiments, the system removes all special characters except a selected set of special characters retained as useful for identifying locations. For example, the system may remove all special characters, such as including, e.g., brackets, asterisks, percentage signs, backslash, except the following:

Hyphen: Some locations include hyphens (e.g., "Al-Hasakah").

Apostrophe or single quote: These symbols are occasionally used to denote possessive forms. (e.g., "Austin's PD reports a three-alarm fire downtown"). As discussed herein, the system can use the names of public agencies (e.g., police departments, fire stations, etc.) to find locations expressed in possessive form.

Hashtag: As previously discussed, this symbol is retained to distinguish hashtag-based locations.

Forward slash: Sometimes this symbol is used to connect multiple locations (e.g., "Hurricane warning for Kings/Queens counties"). Retaining this symbol can help to identify these cases so that "county" can be permuted to both "Kings" and "Queens."

Comma: This symbol is commonly used to associate two locations (e.g., "Orlando, Fla.").

Period, exclamation point, question mark, colon, semicolon: These symbols are often used to identify the end of sentences or end of phrases, which is essential in identifying locations correctly. Consider the posting "Big celebration in New York City. Tonight at 8 pm." If periods were removed from the sentence, the system might mistakenly surmise that "New York City Tonight" is the name of a location. In step 520, once the posting(s) are pre-processed, the method 500 ends.

In some embodiments, the pre-processing method 500 may include only any subset of, or an alternative connection of, the features depicted in or discussed herein in regard to FIG. 5.

Figure 6:
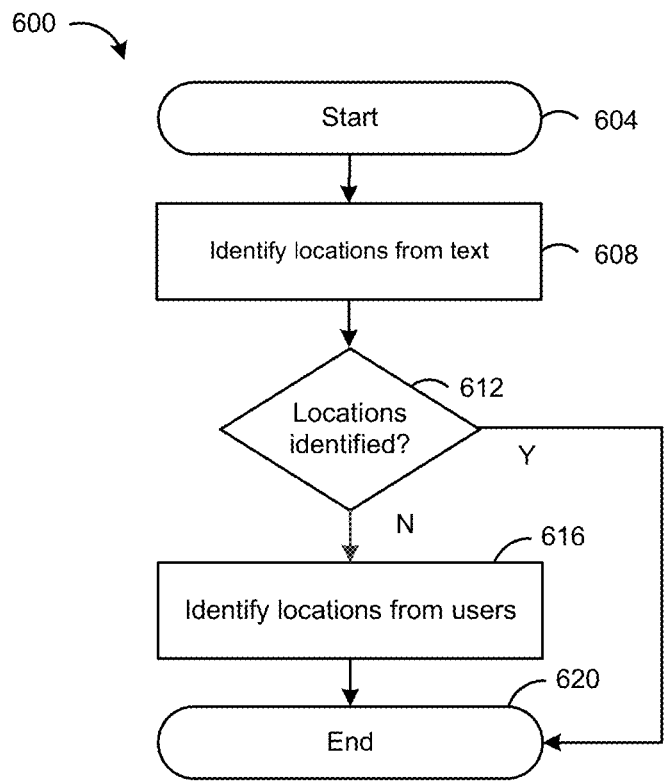
FIG. 6 is a flowchart depicting an embodiment of a location identification method according to an embodiment of the disclosure.

FIG. 6 shows a flowchart depicting an embodiment of a location identification method 600 according to an embodiment of the disclosure. In some embodiments, location identification method 600 is performed as step 216 of method 200 by location mention identification module 132. In the embodiment shown, method 600 begins at step 604. As previously discussed, the system can work in two modes: single and multi-posting mode. In both cases, in step 608, the system identifies locations mentioned in the text of each posting it retrieves. In step 612, if one or more locations are identified from the posting text, method 620 ends. In some instances, there is not enough information in a posting (or set of postings) to identify any locations. In step 612, if no location is identified from the posting text, method 600 proceeds to step 616 to identify locations from user profiles. Different location identification thresholds can be used to determine whether sufficient locations have been identified in step 612. For example, if the system finds fewer than two location mentions in the message, it also extracts user locations and adds them to the set of potential locations in step 616. In some embodiments, user locations can be identified even if locations are identified from text. For example, step 612 can be removed from method 600 and locations can be identified from both text and from user locations.

In some embodiments, the location identification method 600 may include only any subset of, or an alternative connection of, the features depicted in or discussed herein in regard to FIG. 6.

Returning to FIG. 3, the depicted embodiment of the location mention identification module 132 includes a taxonomy-based classifier module 324, a heuristic-based classifier module 328, and a knowledge-base (KB) based classifier module 332. In the embodiment shown, location mention identification module 132 also includes a location taxonomy list and/or table 336 and an alias KB database 340 although one or more of these elements may be located outside location mention identification module 132. Taxonomy-based classifier module 324 is configured to perform a taxonomy-based approach to detect location mentions from the text of a social media posting, heuristic-based classifier module is configured to perform a heuristic-based approach, and KB-based classifier module 332 is configured to perform a KB-based approach. In the embodiment shown, the taxonomy-based classifier module 324 can communicate with location taxonomy list and/or table 336 and KB-based classifier module 332 can communicate with alias KB database 340. In the embodiment shown, taxonomy-based classifier module 324, heuristic-based classifier module 328, and KB-based classifier module 332 each receive one or more social media postings, such as from social posting stream 304 via the communication interface 144 (omitted from this figure for clarify of illustration). Receipt of the social media postings and/or implementation of the location detection processes can be in parallel and/or in series.

Figure 7:
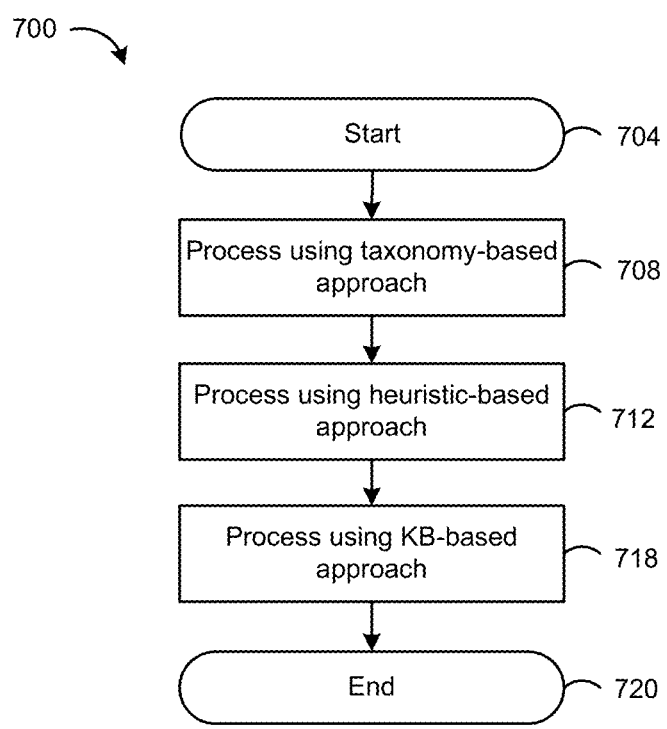
FIG. 7 is a flowchart depicting an embodiment of a method of identifying locations from the text of a social media posting according to an embodiment of the disclosure.

FIG. 7 shows a flowchart depicting an embodiment of a method 700 of identifying locations from the text of a social media posting according to an embodiment of the disclosure. In the embodiment shown, method 700 is performed by location mention identification module 132 and is performed serially. In embodiments, the location identification method 700 may be performed as step 216 of method 200 and/or as step 608 of method 600. In the embodiment shown, method 700 begins at step 704. At step 708, location mentions are detected from one or more social media postings using a taxonomy-based approach. At step 712, location mentions are detected from one or more social media postings using a heuristic-based approach. At step 716, location mentions are detected from one or more social media postings using a KB-based approach. Method 700 ends at step 720.

In some embodiments, the method 700 for identifying locations from the text of a social media posting may include only any subset of, or an alternative connection of, the features depicted in or discussed herein in regard to FIG. 7.

Figure 8:
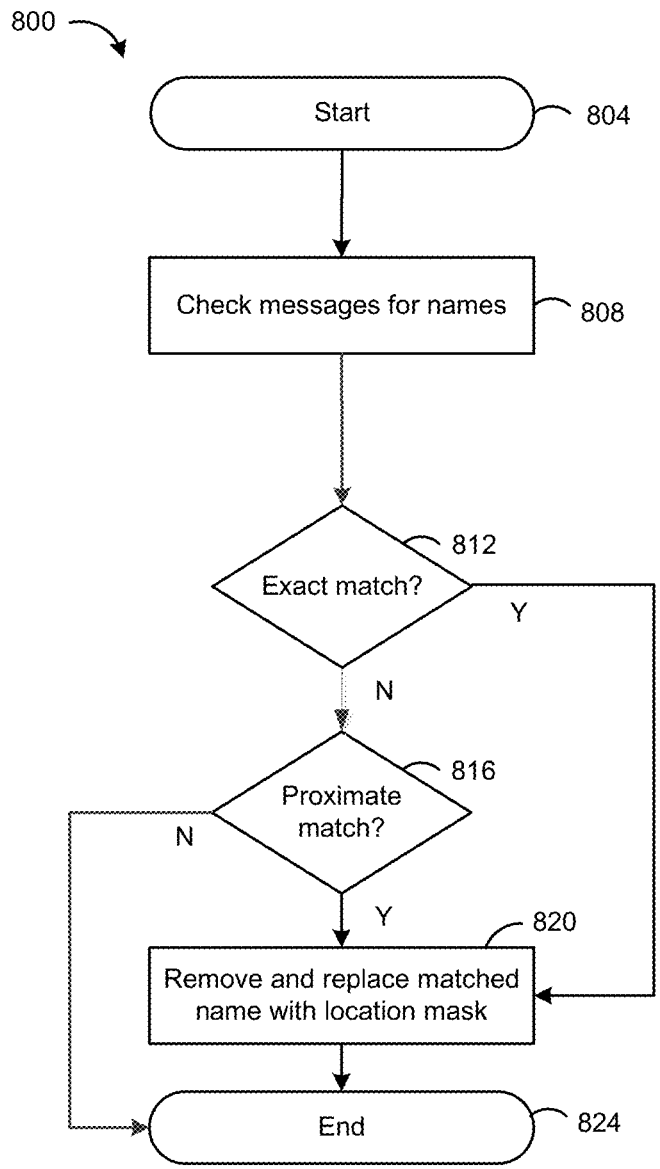
FIG. 8 is a flowchart depicting an embodiment of a method implementing a taxonomy-based approach according to an embodiment of the disclosure.

FIG. 8 shows a flowchart depicting an embodiment of a method 800 implementing a taxonomy-based approach according to an embodiment of the disclosure. In embodiments, method 800 is implemented at step 708 of method 700 by taxonomy-based classifier module 324. Method 800 begins at step 804 and uses a standard taxonomy to detect common locations from posting text. Names of large and/or well-known geo-locations such as countries, continents, states, and provinces can be curated and/or collected to generate a taxonomy list 336 of location names. In some embodiments, taxonomy list 336 can include thousands of names. In step 808, the location names making up taxonomy list 336 are retrieved by taxonomy-based classifier module 324 and are compared against the text of each received social media posting to see if any location names from taxonomy list 336 occur anywhere in the posting text.

In step 812, the system determines whether there is an exact match between a location mention in the text and a location included in taxonomy list 336. If there is no exact match, method 800 proceeds to step 816. If there is an exact match, method 800 proceeds to step 820. In step 816, in cases when an exact match is not found, the system determines whether there is a proximate match. In this step, the system parses the text for words that may be related to a particular location but may not exactly match a location from taxonomy list 336. For instance, nationalities found in the text can be mapped to their corresponding countries from taxonomy list 336 (e.g., "Canadian" can be matched to "Canada"). Possessive forms can also be mapped to their corresponding locations from taxonomy list 336 (e.g., "Louisiana's fire departments" can be matched to "Louisiana."). In step 820, once a word from the posting text is matched (either exactly or proximately) to a term in taxonomy 336, it is removed and replaced by a location mask (e.g., "<loc>") in a processed version of the social media posting. By removing location mentions when they are matched, the system can avoid processing the same location mention multiple times and preserve system resources. For example, the posting shown in FIG. 4(*c*) contains the term "Brussels." If "Brussels" is included as a location in taxonomy list 336, the term "Brussels" is removed and replaced by a location mask to avoid unnecessary processing. Method 800 ends at step 824. In some embodiments, even though processing overhead is increased, method 800 can determine proximate matches even when exact matches are also determined.

In some embodiments, the method 800 for implementing a taxonomy-based approach may include only any subset of, or an alternative connection of, the features depicted in or discussed herein in regard to FIG. 8.

Figure 9:
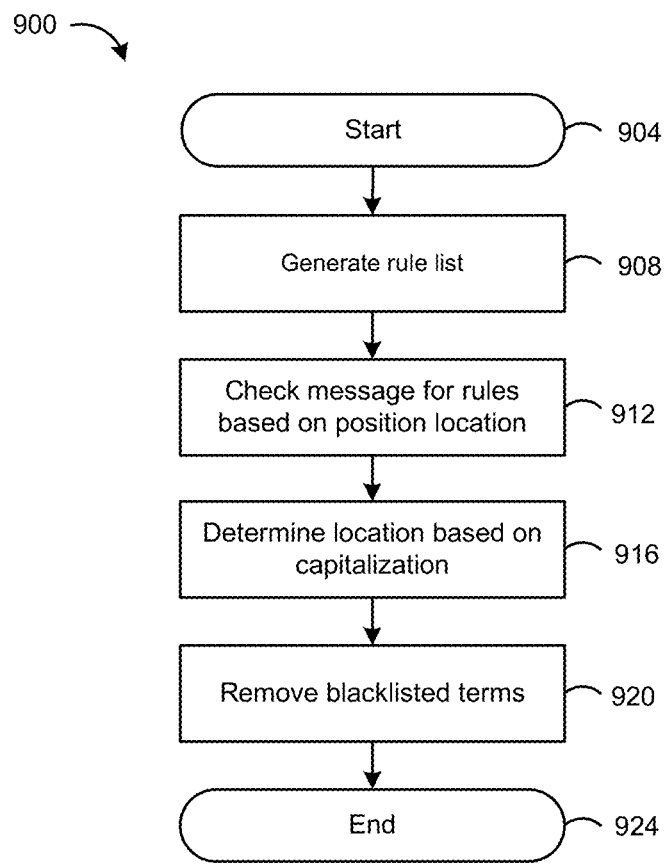
FIG. 9 is a flowchart depicting an embodiment of a method implementing a heuristic-based approach according to an embodiment of the disclosure.

FIG. 9 shows a flowchart depicting an embodiment of a method 900 implementing a heuristic-based approach according to an embodiment of the disclosure. In the embodiment shown, method 900 is implemented at step 712 of method 700 by heuristic-based classifier module 328. Method 900 begins at step 904. In addition to standard taxonomy, the system uses a set of standard heuristics to identify words or phrases from the social media posting that are likely to refer to locations. At step 908, the system generates a rule list correlating particular words or phrases found in certain positions in the text with possible locations. At step 912, the system checks the posting for text that matches rules from the rule list. Table 1 shown below lists some of these words/phrases as "clues" along with a few examples of possible correlated locations.

TABLE 1

List of clues used to identify location mentions heuristically.

| Clue | Position w.r.t the location | Examples | Examples of Exceptions |
| --- | --- | --- | --- |
| Cardinal directions | Prefix | North Aleppo<br>Southwestern Aleppo<br>North of Aleppo<br>Southeast of Aleppo | North of the city<br>Northwest Bank |
| Landmark identifiers | Prefix/Suffix | City of Aleppo<br>Aleppo City<br>Gulf of Mexico<br>Suburb of New Jersey | City Bank<br>State Department<br>Islamic State |
| Distance indicators | Prefix | 3 miles from NYC<br>Five kilometers of NJ | Five miles of wheat fields |
| Urban landmark indicators | Suffix | St. John's high school<br>JFK airport<br>Manila City Hall | My niece's high school |
| Natural landmark indicators | Prefix/Suffix | Red River<br>Mnt Rushmore<br>Green Lake | Deep river<br>River basin |
| Agencies | Suffix | NYC police<br>LA fire department | Higher police presence |
| City area | Prefix | Downtown Los Angeles | Uptown girl |
| Movement indicators | Prefix | Hurricane moving towards NJ<br>Typhoon tearing through NYC<br>Festival coming to LA | Coming to my friend's house<br>Moving towards an agreement |
| Border indicators | Prefix/Suffix | Border between NY and NJ<br>Intersection of Main and 17th<br>NY/NJ border | Doctors Without Borders<br>Borders on insanity |

TABLE 1-continued

List of clues used to identify location mentions heuristically.

| Clue | Position w.r.t the location | Examples | Examples of Exceptions |
| --- | --- | --- | --- |
| Pronouns | Prefix | <u>In</u> NYC<br><u>At</u> the JFK | <u>In</u> conversations<br><u>At</u> home |

For example, the system may detect the term "North" in the posting text and determine that this term correlates to a rule from the rule list, namely that the term "North" is a cardinal direction and is used as a prefix. The middle-right column of Table lists examples where the rule correctly detects a location mention in the text. However, the rightmost column of Table 1 lists examples where the rules match words in the text but the word that precedes or succeeds them is not a location. In order to recognize these cases, the system implements step 916 to determine a location based on capitalization. If the word in the posting text seems to have proper capitalization (e.g. if the word is not written in ALL-CAPS or Title Case (i.e., using only capital letters to start principle words)), then the system relies on capitalization to determine if the words adjacent to the words matching a rule refer to a location. Words not beginning with capital letters are less likely to be locations. As shown in Table 1, when the term "North" is determined to be near the capitalized word "Aleppo," "Aleppo" is determined to be a location mention. However, when the term "North" is determined to be near the non-capitalized word "city," "city" is not determined to be a particular location mention.

As can be seen, step 916 can still match words to locations that are not locations (i.e., "Northwest Bank" satisfies the capitalization rule but is not a location mention. In order to mitigate these false matches, the system implements step 920 to remove and/or ignore certain blacklisted terms. In some embodiments, each rule has a list of blacklisted terms associated with it. For example, the Landmark Identifiers rule shown in Table 1, a blacklisted term is "The Islamic State" because it is a commonly-used term that does not correspond to a location mention for the general landmark identifier "state." Method ends at step 924.

In some embodiments, the method 900 for implementing a heuristic-based approach may include only any subset of, or an alternative connection of, the features depicted in or discussed herein in regard to FIG. 9.

Figure 10:
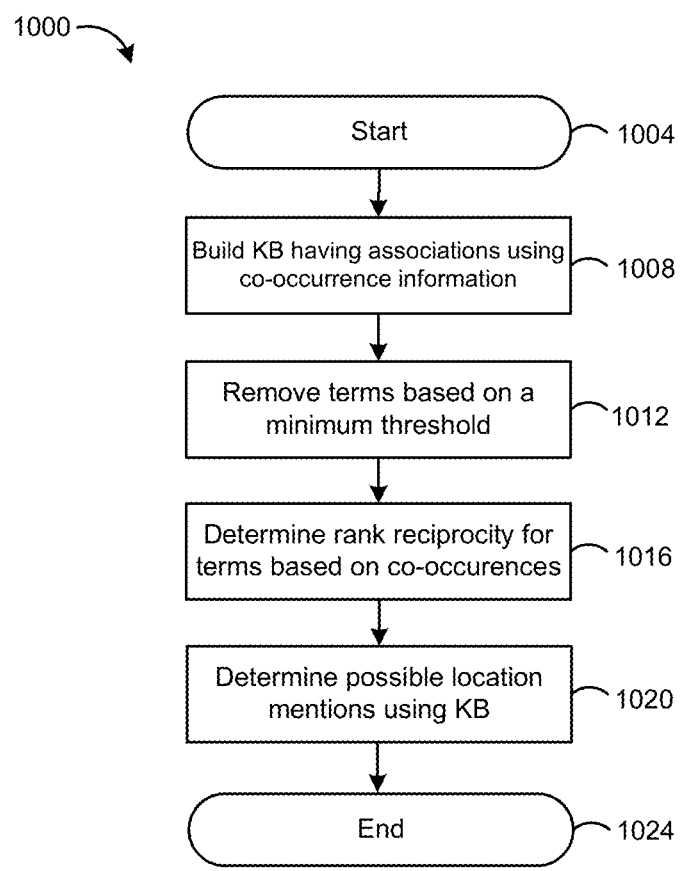
FIG. 10 is a flowchart depicting an embodiment of method implementing a knowledge-based (KB) approach according to an embodiment of the disclosure.

FIG. 10 shows a flowchart depicting an embodiment of method 1000 implementing a knowledge-based (KB) approach according to an embodiment of the disclosure. In embodiments, method 1000 is implemented at step 716 of method 700 by KB-based classifier module 332. A typical problem in identifying location mentions is the prominence of terms such as "NYC," "LA," "PDX," "Big Apple," and other common aliases for locations. Some of these aliases are known and can be supplied manually using a lexicon. However, sometimes local news outlets popularize a term that does not catch on in global media. For instance, "J&K" is commonly used to refer to "Jammu and Kashmir" in Indian media, but not elsewhere. Additionally, some events generate news hashtags that are tied to a particular location (e.g., "# LAFlood"). Additionally, some official weather accounts use a standard format to indicate a location. For example, "# nywx" refers to weather forecasts for New York. These types of aliases are not easy to detect or curate using traditional lexicons. Therefore, it may be important to dynamically detect these terms and associate them with their corresponding location, especially if they occur frequently. The system uses a dynamically self-adjusting Knowledge-Base (KB) to achieve this functionality. In some embodiments, the dynamically self-adjusting Knowledge-Base (KB) is stored in database 340 shown in FIG. 3.

In the embodiment shown, method 1000 begins at step 1004. At step 1008, the system builds the KB by using co-occurrence information to determine associations between locations and their aliases. For instance, if "New York City" frequently co-occurs with "NYC" in social media postings, the system updates the KB to align the two terms.

Using the KB, the system can remove incorrect alignments. At step 1012, the system determines whether two terms in the KB satisfy a minimum threshold for co-occurrence. For instance, the terms "New York City" and "NYC" have to occur together more than 1,000 times (i.e., the minimum threshold) to be considered. If the system determines that the terms do not meet the minimum threshold, the terms are removed from the KB.

At step 1016, the system determines a rank reciprocity for the terms based on the co-occurrence information. In some embodiments, the system first ranks each term based on the frequency of its co-occurrence with another term. For instance, if "NYC" is the second-most common term that co-occurs with "New York City," then its rank with regards to "New York City" will be "2." After all ranks are calculated, the system checks to see if "NYC" and "New York City" reciprocate each other's rank. For instance, if "NYC" is the top most frequent term that co-occurs with "New York City" (i.e., ranked "1"), the system determines whether "New York City" also the top most frequent term (i.e., ranked "1") that co-occurs with "NYC." If the ranks match, the two terms are determined to satisfy rank reciprocity and are recognized as alias pairs in the KB. In embodiments, the KB may be dynamically updated periodically (e.g., every week) to expand its collection of alias alignments.

At step 1020, the system uses the KB to detect aliases that occur in the posting and determine a location corresponding to each alias. During the processing of a posting to determine locations, if an alias appears as a potential location, both the alias and its corresponding match can be added as a location. For instance, if "NYC" appears in the posting (such as in the example shown in FIG. 4(d)), both "NYC" and "New York City" are marked as potential location mentions. Method ends at step 1024.

In some embodiments, the method 1000 for implementing a KB-based approach may include only any subset of, or an alternative connection of, the features depicted in or discussed herein in regard to FIG. 10.

Returning to FIG. 3, the depicted embodiment of the location determining module 136 includes a geo-coordinator 344, a geo-coordination library and/or service 348, and a user-type validator 352. In other embodiments, the user-type validator 352 may be located outside location determining module 136. Geo-coordinator 344 is configured to receive the results of all three location detection approaches (e.g., taxonomy-based, heuristic-based, and KB-based) discussed above as a list of potential locations. In the embodiment shown, geo-coordinator 344 is also configured to receive one or more validated user locations from user-type validator 352. In the embodiment shown, user-type validator 352 can receive a posting 316 and a user location 320 and determine if the posting account represents a particular type of account such as a fire or police department, local news outlet, or other public service account. In the embodiment shown, geo-coordinator 344 can communicate with a geo-coordination library and/or service 348 to determine geo-coordinates for each of the potential location mentions received from location mention identification module 132. Geo-coordination library and/or service 348 can be a third-party library comprising a database correlating particular locations with geo-coordinates.

Figure 11:
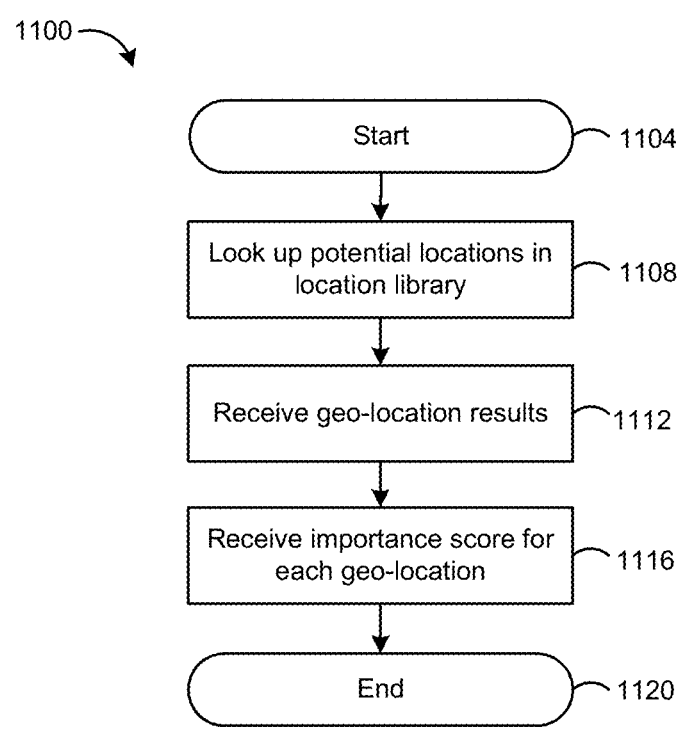
FIG. 11 is flowchart depicting an embodiment of method of determining location geo-coordinates according to an embodiment of the disclosure.

FIG. 11 shows a flowchart depicting an embodiment of method 1100 of determining location geo-coordinates according to an embodiment of the disclosure. In embodiments, method 1100 is implemented at step 220 of method 200 by location determining module 136 shown in FIG. 3. In the embodiment shown, method 1100 begins at step 1104. At step 1108, the system looks up each of the potential locations received from location mention identification module 132 in geo-coordination library and/or service 348. In some embodiments, the library 348 can be a third-party location library, such as, e.g., Nominatim, although other third-party location libraries can be used. This particular library receives data from the OpenStreetMap (OSM) project, which periodically provides a dump of all geo-locations around the globe that can be uploaded to a database. The location library provides a mechanism to easily access and query the database and can provide a REST service and a GUI for easy navigation. At step 1112, the system receives geo-location results from the location library for each potential location. If a word is looked up in the location library, it returns a set of geo-location results that the word can correspond to. At step 1116, the geo-location results can each have a score, such as an importance score, representing the strength of an association between the potential location and a particular geo-location. In embodiments, the score may be received from the library 348. In other embodiments, the score may be separately calculated. At step 1120, the method ends.

In some embodiments, the method 1100 for detecting determining location geo-coordinates may include only any subset of, or an alternative connection of, the features depicted in or discussed herein in regard to FIG. 11.

Figures 12A, 12B:
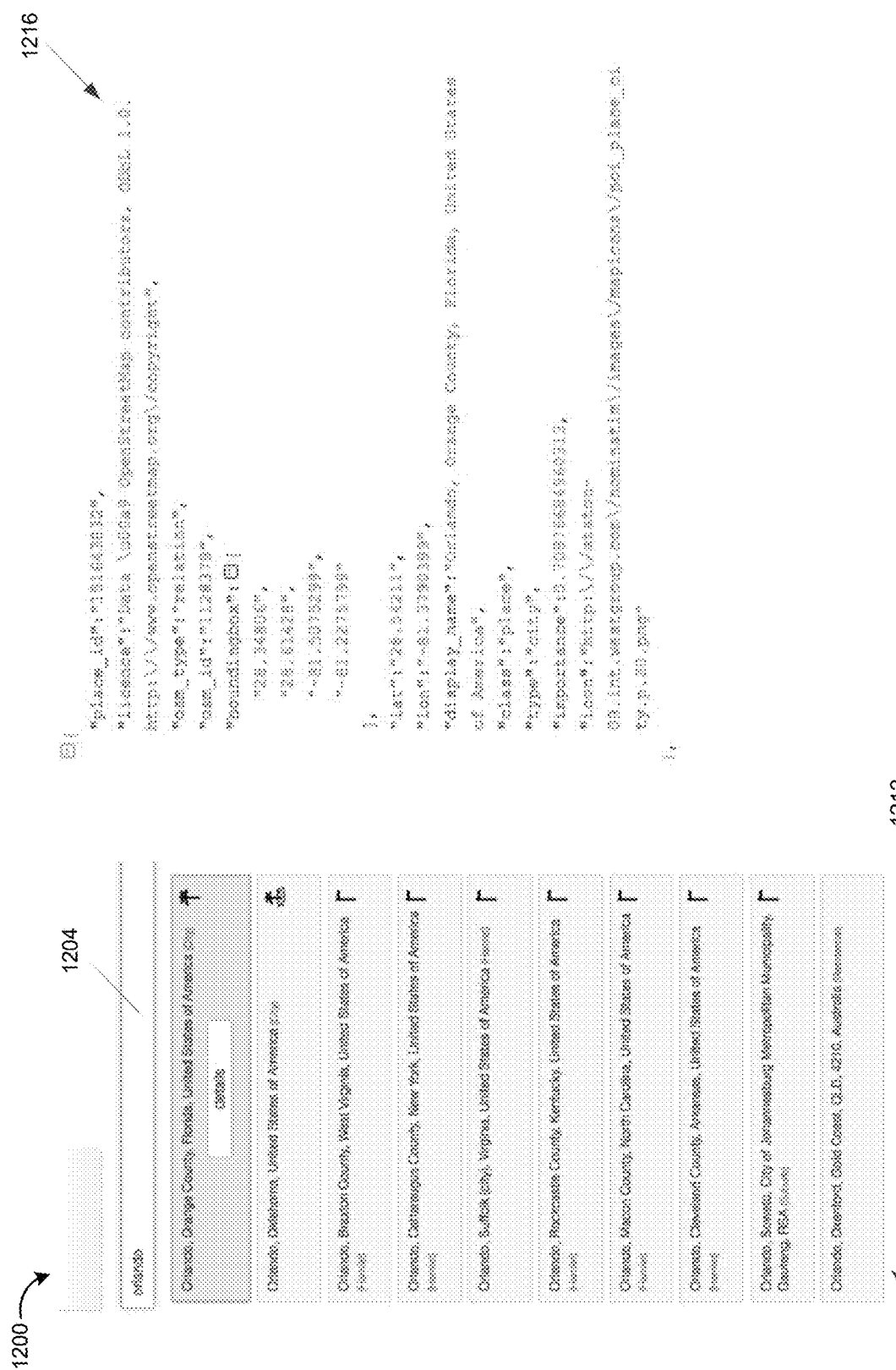
FIG. 12(a)-12(b) shows an exemplary output from an exemplary location library according to an embodiment of the disclosure.

FIGS. 12(a)-12(b) show exemplary outputs 1200 from an exemplary location library according to an embodiment of the disclosure. In FIG. 12(a), the query "orlando" 1204 was looked up in a location library and a listing of results 1208 was returned. In the embodiment shown, the listing of results 1208 can be supplemented and/or replaced by a selection of button 1212. In FIG. 12(b), each result 1208 includes data 1216 including a latitude/longitude geo-coordinate pair, a polygon, some metadata indicating the result's larger context (e.g., province, country), and an importance score that shows a degree of commonality between the association between the query 1204 and the result 1208. In other words, the importance score represents the degree of correlation between the queried location and each geo-location result. For instance, the importance score for Orlando, Fla. is about 0.71, while the importance score for Orlando, Ark. is 0.37. The system can use this information to find the most likely geo-coordinates for each potential location.

In some embodiments, the exemplary output 1200 from an exemplary location library may include only any subset of, or an alternative connection of, the features depicted in or discussed herein in regard to FIGS. 12(a)-12(b).

Returning to FIG. 3, the depicted embodiment of the qualifying module 140 includes a location disambiguation engine 356, a user-location validator 360, and a location ranking engine 364. In the embodiment shown, qualifying module 140 is configured to receive the results from the location library discussed above as a list or set of geo-coordinates and importance scores of potential locations. In the embodiment shown, qualifying module 140 is configured to qualify and validate the list of potential locations and determine a primary location and corresponding geo-coordinates.

Figure 13:
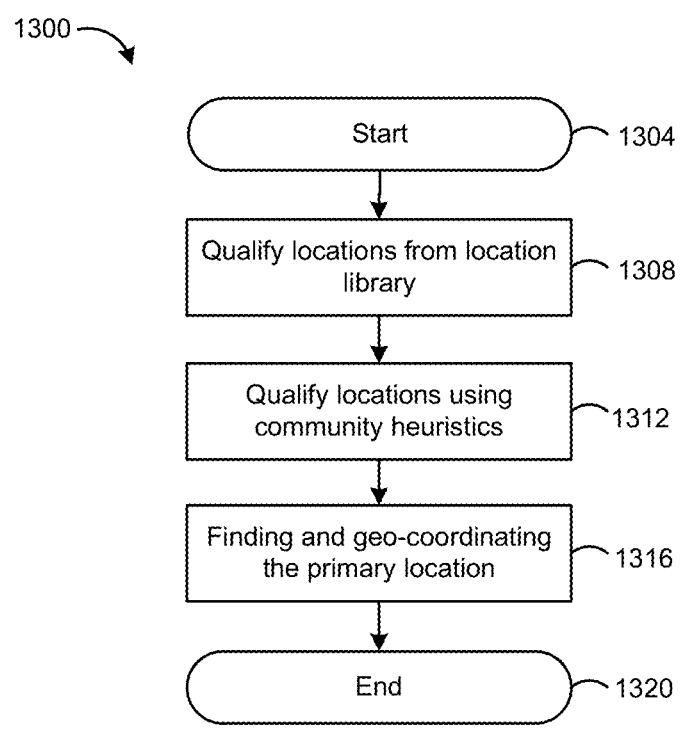
FIG. 13 is a flowchart depicting an embodiment of a method of qualifying locations according to an embodiment of the disclosure.

FIG. 13 shows a flowchart depicting an embodiment of a method 1300 of qualifying locations according to an embodiment of the disclosure. In embodiments, method 1300 is implemented at step 224 of method 200 by qualifying module 140 shown in FIG. 3. In the embodiment shown, method 1300 begins at step 1304. At step 1308, the system qualifies location results from the location library using the importance scores. At step 1312, the system qualifies user locations using community heuristics based on types of user accounts and user locations. In some embodiments, these steps may include processes that identify and remove words that are not locations. For example, these are words that have been identified as locations by mistake or self-identified user locations that are not viable, such as "Planet Earth." At step 1316, the system finds and geo-coordinates a primary location determined from the list of remaining qualified potential locations. For example, once certain locations have been removed, for the remaining locations, the system can determine the "best" or most likely geo-coordinates from the list provided by the location library. At step 1320, the method ends.

In some embodiments, the method 1300 for qualifying locations may include only any subset of, or an alternative connection of, the features depicted in or discussed herein in regard to FIG. 13.

Figure 14:
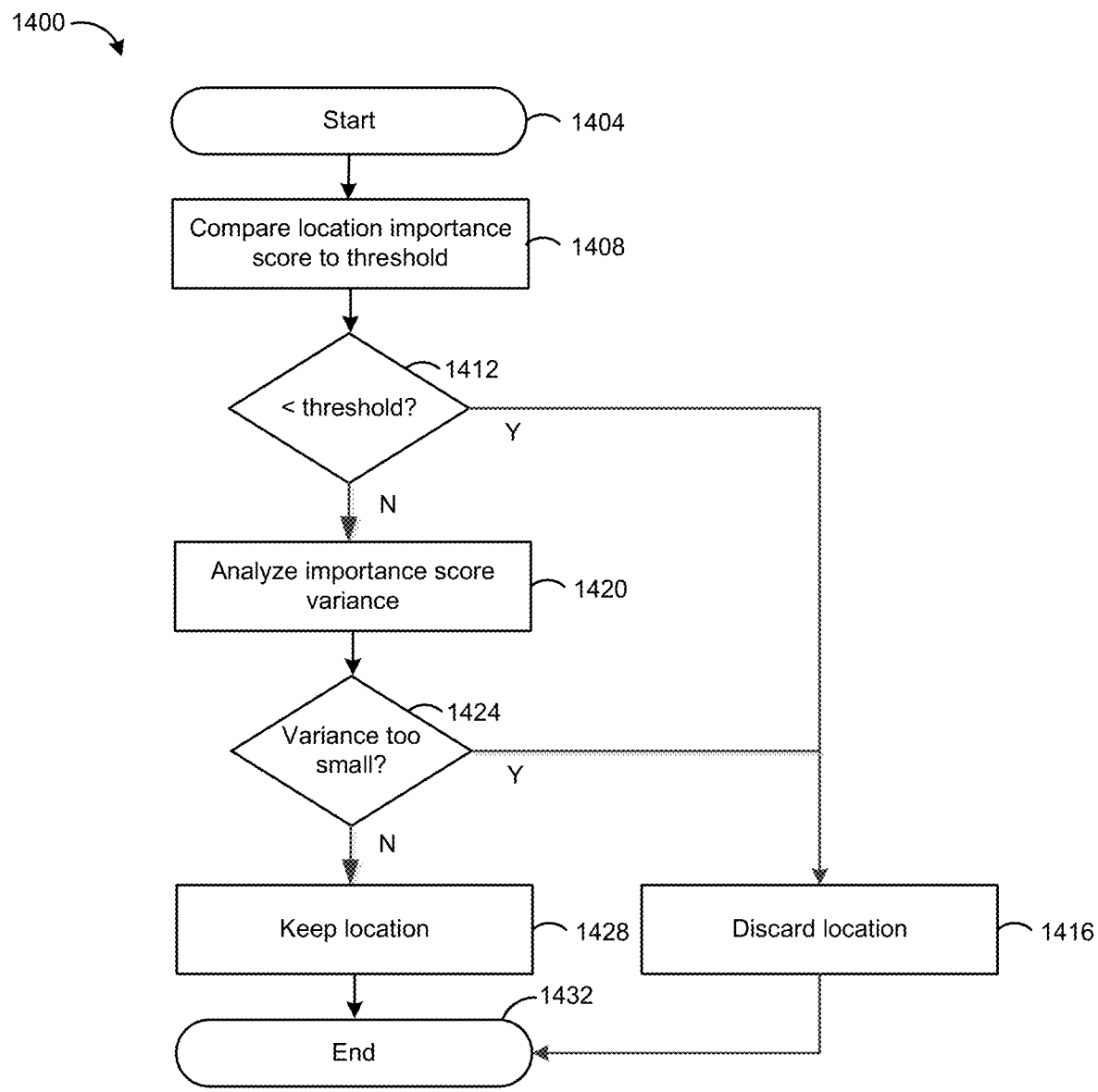
FIG. 14 is a flowchart depicting an embodiment of a method of qualifying locations from a location library according to an embodiment of the disclosure.

FIG. 14 shows a flowchart depicting an embodiment of a method 1400 of qualifying locations from a location library according to an embodiment of the disclosure. In embodiments, method 1400 is implemented at step 1308 of method 1300 by location disambiguation engine 356. Method 1400 begins at step 1404. At step 1408, the system analyzes the results from the location library, such as by comparing the importance score of each result to an importance score threshold. At step 1412, the system determines whether an importance score of a particular result is lower than the threshold. If the importance score is lower than the threshold, the system discards the location result at step 1416. The system performs this analysis for each location result returned by the location library. If the importance score of the top result returned by the location library is below the threshold, it likely means that the location is too obscure to be reliable. For instance, "The Milky Way" might match the name of a bar in New Jersey, but the system will not recognize (i.e., discard) this location if its importance score is below the threshold.

If the importance score of a result is determined to be greater than or equal to the score threshold, the process moves to step 1420 and analyzes the important score variance of the results in the list. At step 1412, the system determines whether the variance in important scores across the entire listing of results is lower than a variance threshold. If the variance is lower than the variance threshold, the system discards the location result at step 1416. If the variance of the importance score of the results is below a variance threshold, it likely means that the system does not have enough confidence in coming up with a definitive geo-location for a potential location. For instance, "The Milky Way" might be the name of both a bar in New Jersey and a cafe in Washington, D.C. However, since both landmarks are relatively obscure, the location library will assign similarly low importance scores to these results and they will be subsequently removed from the set of potential locations. If the variance is higher than the variance threshold, the system keeps the location result at step 1428. At step 1432, method 1400 ends.

In some embodiments, the method 1400 for qualifying locations from a location library may include only any subset of, or an alternative connection of, the features depicted in or discussed herein in regard to FIG. 14.

Figure 15:
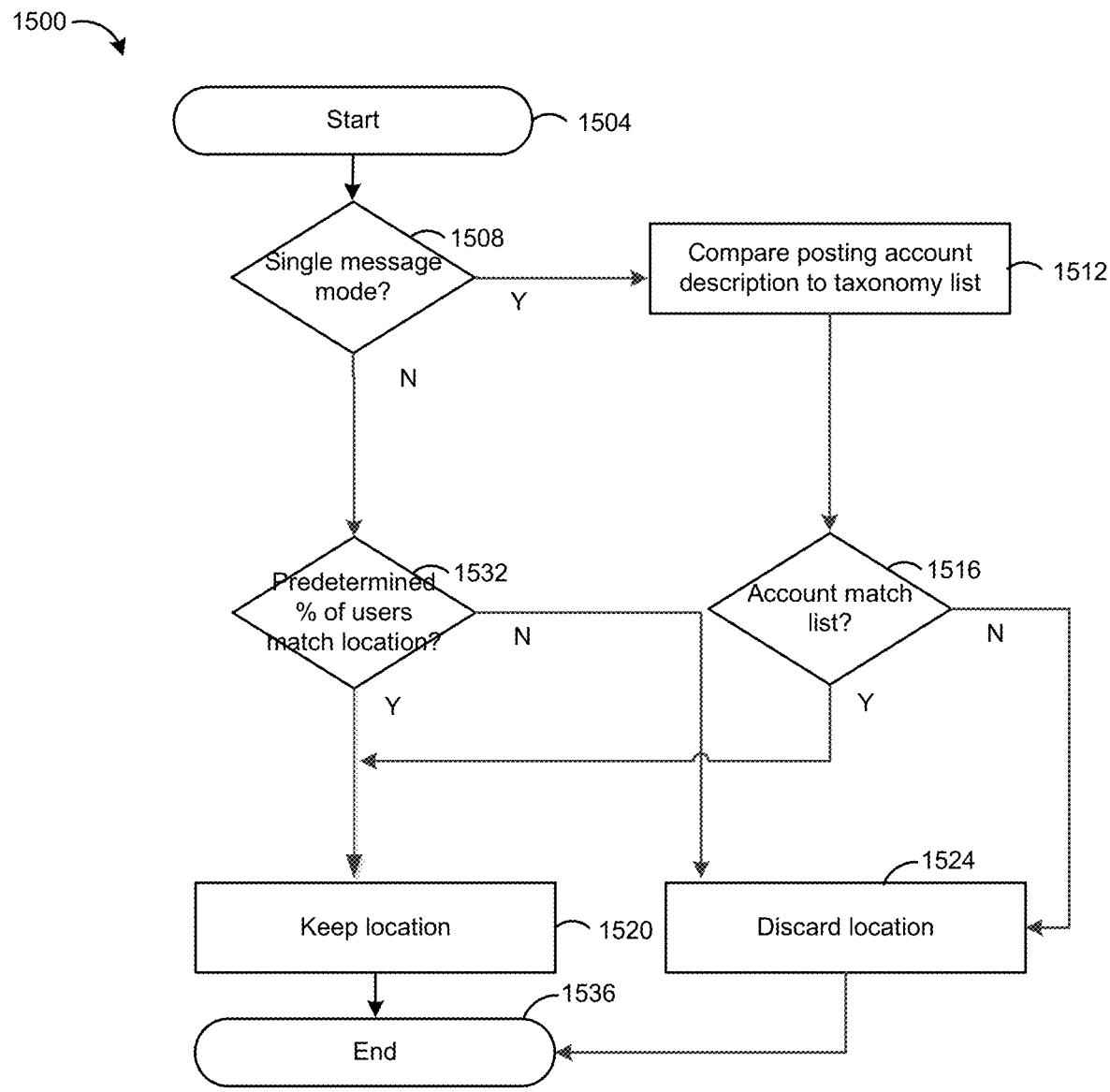
FIG. 15 is a flowchart depicting an embodiment of a method of qualifying locations using community heuristics according to an embodiment of the disclosure.

FIG. 15 shows a flowchart depicting an embodiment of a method 1500 of qualifying user locations using community heuristics according to an embodiment of the disclosure. In embodiments, method 1500 is implemented at step 1312 of method 1300 by user location validator 360. User locations aren't always related to the location of a particular event. This may especially be true for targeted attacks such as terror attacks which may often happen in crowded locations prone to transit, such as airports and tourist attractions. For example, referring to FIG. 4(*b*), a social media posting including a witness account from a Nice terrorist attack (location mention 408) may be posted by a user from Monaco. Therefore, the system may qualify user locations to determine a reliable geo-location.

In the embodiment shown, method 1500 begins at step 1504. At step 1508, the system determines whether it is retrieving social media posts in a single-posting mode or a multi-posting mode, such as a function of a setting or input from a user or other application. If a single-posting mode is determined, method 1500 proceeds to step 1512. In embodiments, step 1512 may be performed by user-type validator 352. In single-posting mode, the system may only accept the user location if the account is of a reliable type. Often, reliable accounts are official accounts from local news agencies, disaster response teams, police, or fire departments. In order to determine whether a user account is reliable, the system can use a standard set of a words (e.g., "fire," "police," etc.) and match them against an account's description and name. In order to identify the standard set of a words, the system can curate a list of social media accounts belonging to local news agencies, local government agencies, and fire and police departments. The system can also collect the descriptions of these social media accounts, tokenize them, remove stopwords, and determine the most common terms found in the account descriptions. In some embodiments, an exemplary standard set of words and/or taxonomy list can include words such as "city," "state," "county," "local," "department," "dept.," "police," "emergency," "emergencies," "fire," "911," "breaking," "news," "service," "weather," "station," "traffic," and "channel." The list of accounts can also include accounts having handles that begin or end with "PD" or "FD" (in uppercase) and accounts having descriptions that include the word "official." Additionally, the account list can include all accounts that have a URL ending in ".gov." At step 1512, the system compares the name of the posting account to the determined set of words. At step 1516, it is determined whether the posting account name matches an entry in the determined set of words. If the account name matches an entry in the determined set of words, the potential user location(s) is kept at step 1520. If the account name does not match an entry in the determined set of words, the potential user location(s) is discarded (e.g., ignored) at step 1524. For example, referring to FIG. 4(*a*), a social media posting may contain the term "police" but may be posted by a user in a different location than the described event (e.g., Miami instead of Orlando). The system can compare the account name of the social media posting with the determined set of words and, if the account name does not match an entry in the determined set of words, the potential user location is ignored.

In the embodiment shown, if a multi-posting mode is determined, method 1500 proceeds to step 1532. In multi-posting mode, the system may only accept the user location if at least a certain predetermined percentage of users (e.g., 75%) have the same user location. If the system determines that a certain percentage of users does match the posting user's location, the location is kept at step 1520. If the system determines that a certain percentage of users do not match the posting user's location, the location is discarded (e.g., ignored) at step 1524. For example, if three postings are fed into the system, at least two users will have to have matching locations for their posts to be kept. Matching locations can be identified as "nearby" places (i.e., locations within a predetermined distance or radius of the user location). For instance, one user might identify a user location as "North London" and another user might identify a user location as "South London." The location library can return a list of results/hits for each location. If, among the list of hits there is at least one user pair within a predetermined distance or radius (e.g., 20 miles) from each other, the users can be considered "nearby." Method 1500 ends at step 1536.

In some embodiments, the method 1500 for qualifying user locations using community heuristics may include only any subset of, or an alternative connection of, the features depicted in or discussed herein in regard to FIG. 15.

Figure 16:
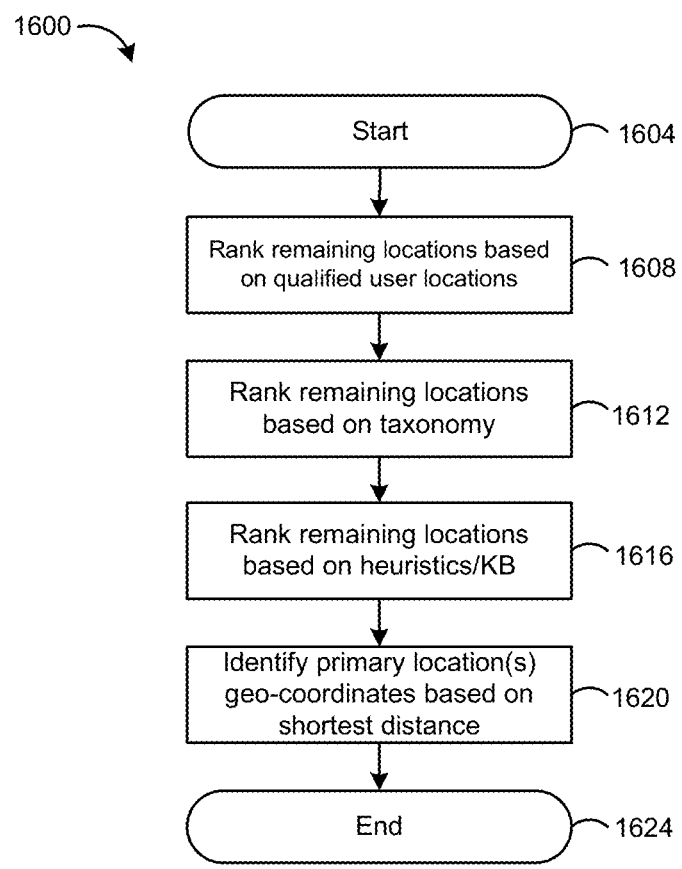
FIG. 16 is a flowchart depicting an embodiment of a method of determining primary location geo-coordinates according to an embodiment of the disclosure.

FIG. 16 shows a flowchart depicting an embodiment of a method 1600 for determining primary location geo-coordinates according to an embodiment of the disclosure. In the embodiment shown, method 1600 is implemented at step 1316 of method 1300 by location ranking engine 364. In method 1600, the system ranks all locations remaining after the completion of the previous processes discussed above. In the embodiments shown, the ranking is based on a confidence level of the relevance of the location to an event that is the subject matter of the social media posting. At step 1608, the system ranks each remaining location based on the set of qualified user locations discussed above. This ranking represents the highest level of confidence that a location corresponds to the event. At step 1612, the system ranks each remaining location based on the location taxonomy list 336 discussed above. This ranking represents a lower level of confidence that a location corresponds to the event compared to a location ranked using a qualified user location. At step 1616, the system ranks each remaining location based on the heuristics used by heuristic-based classifier module 328 and the KB-based classifier module 332 discussed above. This ranking represents the lowest level of confidence that a location corresponds to the event compared to either a location ranked using a qualified user location or a location ranked using location taxonomy list 336.

In the ranking method 1600, each source (e.g., taxonomy, rule-based, and KB) is assigned a separate confidence weight as discussed above in steps 1608, 1612, and 1616. For instance, taxonomy-based locations can have a higher confidence score than heuristics-based or KB locations. Each location can also be given a ranking score based on the following factors: 1) its position within the posting (e.g. leftmost location, rightmost location, second-left location, etc.); and 2) its inclusion within other locations inside the posting (e.g. "Flooding in Paris, France" will have both "Paris" and "France" tagged as locations, but since Paris is located in France, it will have a higher ranking score). The final ranking score can be a linear interpolation of the source confidence weights and the ranking scores. The ranking performance can be assessed within the end-to-end evaluation of the system, and the weights can be tuned such that they give the system maximum performance. In some embodiments, each of steps 1608, 1612, and 1616 are performed on each remaining location. In other embodiments, step 1612 is only performed on a remaining location that could not be ranked at step 1608 and step 1616 is only performed on a remaining location that could not be ranked at either step 1608 or 1612.

At step 1620, the system identifies the geo-coordinates that most closely match each of the locations as primary location geo-coordinates. Having ranked the locations based on the above criteria, the system can use a pairwise minimum-distance process to determine the results/hits that generate the shortest distances. This step can be illustrated with reference to the following scenarios. In scenario A, the following social posting is received: "Two-alarm fire at 30 Main St." For this posting, a qualified user location is "Fort Lee, N.J." In scenario B, the following social posting is received: "Hurricane alert for Paris, Tex." For this posting, no qualified user location could be determined and, therefore, no user location is used.

In scenario A, the system determines a location mention of "30 Main St" and a qualified user location of "Fort Lee, N.J." after implementation of the methods disclosed herein. The system receives results from a location library including three hits: "30 Main St., Brooklyn, N.Y.," "30 Main St., Flushing, N.Y.," and "30 Main St., Fort Lee, N.J." Because the posting includes a qualified user location, the system implements step 1608 and determines a rank of the locations using the qualified user location "Fort Lee, N.J." Based on this ranking, the location result "30 Main St., Fort Lee, N.J." is kept and the other two locations are discarded. In this scenario, steps 1612 and 1616 are not performed because a location ranked using a qualified user location represents the highest confidence level so further processing is unnecessary. The system then implements step 1620 to find a pair of geo-coordinates that corresponds to "30 Main St., Fort Lee, N.J.," and designate those geo-coordinates as corresponding to the primary location of the event described in the posting.

In scenario B, the system determines a location mention of "Paris, Texas" after implementation of the methods disclosed herein. The system receives results from a location library including three hits: "Paris, France," "Paris, Tex.," and "Paris, Ill." However, because the system fails to qualify the user location, it relies solely on the locations mentioned in the posting text to determine the primary location. The system skips step 1608 because there is no qualified user location and implements step 1612 to determine a rank of the locations based on the taxonomy list. Since "Paris" and "Texas" are determined to be the names of a city and state, respectively, from the taxonomy list, "Paris, Texas" is ranked as the most likely location in the list of hits. The system then implements step 1620 to find a pair of geo-coordinates that corresponds to "Paris, Texas" and designate those geo-coordinates as corresponding to the primary location of the event described in the posting.

In the embodiments shown, method 1600 ends at step 1624. When the primary locations geo-coordinates have been determined, the system can enrich the incoming social posting stream 304 by adding the geo-coordinates as metadata fields in the posting object(s). The stream can be consumed by any downstream application seamlessly and in real-time. The downstream applications may include, e.g., news detection, disaster detection, user profiling, etc. applications. For example, in some embodiments, the modified posting objects can be output to another application by communicating with a user system over one or more communication networks. In some embodiments, the modified posting objects can be output directly to a user over one or more communication networks. In some embodiments, the application can run in two modes: single-message and multi-message. Each mode can be used in streaming or pull fashion. For example, clusters of geo-tagged postings in a multi-message mode can be consumed via API calls or via a streaming service that enriches a UI or another application. A single geo-tagged posting in single-message mode can be similarly consumed.

In some embodiments, the method 1600 for determining primary location geo-coordinates may include only any subset of, or an alternative connection of, the features depicted in or discussed herein in regard to FIG. 16.

It may be appreciated that the functions described above may be performed by multiple types of software applications, such as web applications or mobile device applications. If implemented in firmware and/or software, the functions described above may be stored as one or more instructions or code on a non-transitory computer-readable medium. Examples include non-transitory computer-readable media encoded with a data structure and non-transitory computer-readable media encoded with a computer program. Non-transitory computer-readable media includes physical computer storage media. A physical storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also included within the scope of non-transitory computer-readable media. Moreover, the functions described above may be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In fact, persons of ordinary skill in the art may utilize any number of suitable structures capable of executing logical operations according to the described embodiments.

For example, embodiments of the social media system 104, geo-location system 108, application 112, and user system 116, and/or any individual one, subset, or all of the components thereof, may be implemented as hardware, software, or a mixture of hardware and software. For example, each of the social media system 104, geo-location system 108, application 112, and user system 116, and/or any individual one, subset, or all of the components thereof, may be implemented using a processor and a non-transitory storage medium, where the non-transitory machine-readable storage medium includes program instructions that when executed by the processor perform embodiments of the functions of such components discussed herein. In embodiments, each of the social media system 104, geo-location system 108, application 112, and user system 116, and/or any individual one, subset, or all of the components thereof, may be implemented using one or more computer systems, such as, e.g., a desktop computer, laptop computer, mobile computing device, network device, server, Internet server, cloud server, etc.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the disclosed methods, devices, and systems are not intended to be limited to the particular forms disclosed. Rather, they include all modifications and alternatives falling within the scope of the claims, and embodiments other than those shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

Additional embodiments of the social media system 104, geo-location system 108, application 112, and user system 116, and associated methods, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method of determining locations for social media postings, the method comprising:
    retrieving, by communicating with at least one application programming interface (API) of a social media system over one or more first communication networks, at least one social media posting;
    determining at least one location mention in text of the at least one social media posting;
    expanding the at least one location mention to include at least one alias based on an association between the at least one location mention and the at least one alias in a knowledge-base (KB), the KB including associations between location mentions and aliases, an association between a particular location mention and a corresponding alias in the KB being based on a number of times the particular location mention and the corresponding alias co-occur in social media postings;
    determining at least one location for each at least one location mention;
    determining a primary location for each at least one location mention from the at least one location;
    storing, in at least one database on a non-transitory machine-readable storage medium, at least one set of geo-coordinates for the primary location in at least one posting object for the at least one social media posting; and
    outputting, by communicating with a user system over one or more second communication networks, the at least one social media posting with the stored at least one set of geo-coordinates for display on the user system.

2. The method of claim 1, wherein the outputting includes transmitting a signal representing the at least one social media posting with the stored at least one set of geo-coordinates to a server system executing an application, and providing by the application the signal or a second signal based on the signal to the user system.

3. The method of claim 2, wherein the outputting includes transmitting the signal to an API of the application.

4. The method of claim 1, wherein the retrieving includes communicating a request over the one or more first communication networks to the API of the social media system, and receiving a response over the one or more first communication networks from the API of the social media system.

5. The method of claim 1, further comprising pre-processing the at least one social media posting.

6. The method of claim 5, wherein the pre-processing comprises at least one of:
    removing truncations from the at least one social media posting;
    splitting hashtags of the at least one social media posting; or
    removing special characters from the at least one social media posting.

7. The method of claim 1, wherein the determining the at least one location mention comprises at least one of:
    identifying at least one location from text of the at least one social media posting; or
    identifying at least one location from at least one user location of the at least one social media posting.

8. The method of claim 7, wherein the identifying at least one location from text of the at least one social media posting comprises at least one of:
    implementing a taxonomy-based identification method; or
    implementing a heuristic-based identification method.

9. The method of claim 8, wherein the taxonomy-based identification method comprises:
    comparing terms of the at least one social media posting with a list of location names;
    removing at least one matched name when a name from the at least one social media posting matches a name from the name list; and
    replacing the at least one matched name with a location mask.

10. The method of claim 8, wherein the heuristic-based identification method comprises at least one of:
    determining at least one location based on comparing the at least one social media posting to at least one rule based on the at least one position location; or
    determining at least one location based on capitalization of the at least one social media posting; and
    removing at least one blacklisted term from the at least one social media posting.

11. The method of claim 1, further comprising:
    building the KB; and
    periodically updating the KB.

12. The method of claim 1, wherein determining at least one location comprises:
   looking up at least one potential location in a location library;
   receiving one or more geo-location results corresponding to the at least one potential location; and
   determining a score for each of the one or more geo-location results.

13. The method of claim 12, wherein the score is an importance score representing a degree of correlation between the at least one potential location and each of the one or more geo-location results.

14. The method of claim 12, wherein determining at least one location further comprises at least one of:
   qualifying the one or more geo-location results from the location library; or
   qualifying the one or more geo-location results using community heuristics.

15. The method of claim 14, wherein determining at least one location further comprises determining at least one primary geo-location from the qualified one or more geo-location results.

16. The method of claim 15, wherein determining at least one primary geo-location from the one or more geo-location results comprises at least one of:
   ranking the one or more geo-location results based on at least one qualified user location;
   ranking the one or more geo-location results based on results of a taxonomy-based identification method; or
   ranking the one or more geo-location results based on results of at least one of: a heuristic-based identification method and a knowledge-base (KB)-based identification method.

17. The method of claim 16, further comprising identifying geo-coordinates of the at least one primary location based on a shortest distance between a user location and the one or more geo-location results.

18. The method of claim 14, wherein qualifying the one or more geo-location results from the location library comprises:
   comparing the importance score for each of the one or more geo-location results to an importance score threshold; and
   discarding the one or more geo-location results when the importance score is less than the importance score threshold.

19. The method of claim 18, wherein qualifying the one or more geo-location results from the location library comprises:
   analyzing a variance of the importance score when the importance score is greater than the importance score threshold;
   keeping the one or more geo-location results when the variance of the importance score is greater than a variance threshold; and
   discarding the one or more geo-location results when the variance of the importance score is less than the variance threshold.

20. The method of claim 14, wherein qualifying the one or more geo-location results using community heuristics comprises determining whether the at least one social media posting is received in a single posting mode or a multi-posting mode.

21. The method of claim 20, wherein, in the single posting mode, the method further comprises:
   comparing an account name of the at least one social media posting to a taxonomy list;
   keeping the one or more geo-location results when the account name matches the taxonomy list; and
   discarding the one or more geo-location results when the words do not match the taxonomy list.

22. The method of claim 20, wherein, in the multi-posting mode, the method further comprises:
   determining whether the one or more geo-location results match a user location of at least a predetermined percentage of users;
   keeping the one or more geo-location results when it matches the user location of at least the predetermined percentage of users; and
   discarding the one or more geo-location results when it does not match the user location of at least the predetermined percentage of users.

23. The method of claim 1, further comprising including aliases in the KB based on a minimum threshold of co-occurrence.

24. The method of claim 1, further comprising including the corresponding alias for the particular location mention in the KB based on determining a rank reciprocity for the corresponding alias and the particular location mention, the rank reciprocity existing when the corresponding alias and the particular location mention each have the same rank of frequency of co-occurrence with each other in social media postings.

25. A method of determining locations for social media postings, the method comprising:
   retrieving, by communicating with at least one application programming interface (API) of a social media system over one or more first communication networks, at least one social media posting;
   determining at least one location mention in the at least one social media posting;
   determining at least one location based on the at least one location mention;
   determining a primary location from the at least one location;
   storing, in at least one database on a non-transitory machine-readable storage medium, at least one set of geo-coordinates for the primary location in at least one posting object for the at least one social media posting; and
   outputting, by communicating with a user system over one or more second communication networks, the at least one social media posting with the stored at least one set of geo-coordinates for display on the user system;
   wherein the identifying at least one location mention from the at least one social media posting includes:
      building a knowledge base (KB) having a list of associations between location mentions and aliases using co-occurrence information;
      determining an alias using the KB;
      periodically updating the KB;
      removing terms of the KB based on a minimum threshold of co-occurrence; and
      determining a rank reciprocity of terms of the KB based on a frequency of their co-occurrence.

26. A non-transitory machine-readable storage medium including programming instructions, which when executed by at least one processor perform a method of determining locations for social media postings, the method comprising:
   retrieving, by communicating with at least one application programming interface (API) of a social media system over one or more first communication networks, at least one social media posting;

determining at least one location mention in text of the at least one social media posting;

expanding the at least one location mention to include at least one alias based on an association between the at least one location mention and the at least one alias in a knowledge-base (KB), the KB including associations between location mentions and aliases, an association between a particular location mention and a corresponding alias in the KB being based on a number of times the particular location mention and the corresponding alias co-occur in social media postings;

determining at least one location for each at least one location mention;

determining a primary location for each at least one location mention from the at least one location;

storing, in at least one database on the non-transitory machine-readable storage medium, at least one set of geo-coordinates for the primary location in at least one posting object for the at least one social media posting; and outputting, by communicating with a user system over one or more second communication networks, the at least one social media posting with the stored at least one set of geo-coordinates for display on the user system.

27. A system for determining locations for social media postings, the system comprising:

at least one processor; and a non-transitory machine-readable storage medium including programming instructions, which, when executed by at least one processor, perform a method of determining locations for social media postings, the method comprising:

retrieving, by communicating with at least one application programming interface (API) of a social media system, at least one social media posting;

determining at least one location mention in text of the at least one social media posting;

expanding the at least one location mention to include at least one alias based on an association between the at least one location mention and the at least one alias in a knowledge-base (KB), the KB including associations between location mentions and aliases, an association between a particular location mention and a corresponding alias in the KB being based on a number of times the particular location mention and the corresponding alias co-occur in social media postings;

determining at least one location for each at least one location mention;

determining a primary location for each at least one location mention from the at least one location;

storing, in at least one database on the non-transitory machine-readable storage medium, at least one set of geo-coordinates for the primary location in at least one posting object for the at least one social media posting; and outputting, by communicating with a user system over one or more second communication networks, the at least one social media posting with the stored at least one set of geo-coordinates for display on the user system.

28. The system of claim 27, wherein the method further comprises:

determining at least one taxonomy-based classifier based on at least one location taxonomy; or determining at least one heuristic-based classifier.

29. The system of claim 27, wherein the method further comprises at least one of:

determining one or more geo-coordinates based on one or more geo-locations from a location library; or determining one or more geo-coordinates based on a user account type.

30. The system of claim 27, wherein the method further comprises:

determining at least one valid user location;

removing at least one non-valid user location;

ranking one or more geo-coordinates; and identifying geo-coordinates of at least one primary location based on a shortest distance between the at least one valid user location and the one or more geo-coordinates.

* * * * *